United States Patent
Desmarais

(10) Patent No.: US 6,283,527 B1
(45) Date of Patent: Sep. 4, 2001

(54) BALLAST FOR CARGO BEDS OF TRUCKS

(76) Inventor: Donald G. Desmarais, 67 Jonathan St., Gardner, MA (US) 01440

( * ) Notice: Subject to any disclaimer, the term of this patent is extended or adjusted under 35 U.S.C. 154(b) by 0 days.

(21) Appl. No.: 09/693,131

(22) Filed: Oct. 20, 2000

(51) Int. Cl.⁷ ................................................. B60R 7/00
(52) U.S. Cl. ................................ 296/39.2; 280/759
(58) Field of Search ........................ 296/39.2, 37.6, 296/39.1; 280/757, 759

(56) References Cited

U.S. PATENT DOCUMENTS

| | | | | |
|---|---|---|---|---|
| 4,796,914 | * | 1/1989 | Raynor | 280/757 |
| 4,902,038 | * | 2/1990 | Grover | 280/759 |
| 4,971,356 | * | 11/1990 | Cook | 280/759 |
| 5,330,227 | * | 7/1994 | Anderson | 280/759 |

* cited by examiner

*Primary Examiner*—Joseph D. Pape
(74) *Attorney, Agent, or Firm*—Mårk P. White

(57) ABSTRACT

A system for providing ballast for cargo bed of trucks consisting of a multiplicity of interlocking low-profile hollow containers interconnectively-assembled across the entirety of a cargo bed of a pickup truck and secured to the bed of the truck with bolts. When the individual containers are filled with a weighted material, such as water or sand, each container preferably will weight less than 50 pounds, and the flat weighted structure provides additional traction to the drive wheels of the truck on slippery road surfaces. In an alternate application, the filled containers are stacked at selective locations and secured to the truck bed to provide a counter-balancing weight for a heavy piece of cargo that is not placed in the gravitational center of the cargo bed.

9 Claims, 4 Drawing Sheets

BALLAST FOR CARGO BEDS OF TRUCKS

FIELD OF THE INVENTION

This invention relates to the field of ballast, and more particularly to a system for providing selective weight distribution in pickup trucks.

BACKGROUND OF THE INVENTION

Light trucks, such as pick up trucks, are typically used for hauling a wide variety of cargoes. Although the cargo bed of such trucks are designed to have the center-of-gravity of the cargo optimally located in the center of the bed to provide for uniform loading on the axles of the truck, sometimes an item of cargo has a significantly non-uniform weight distribution which can prevent this from being realized. In some of these cases, such load imbalances can create performance and safety problems in the operation of the vehicle. Further, the suspension of such vehicles are designed for a fully-loaded truck, and an unloaded truck can at times have insufficient weight to allow for good traction in slippery road conditions.

In addition, much of the prior art does not provide a secure attachment of the ballast to the truck. Emergency braking, and collisions can cause severe safety problems when such ballast becomes dislodged while the truck is under way.

Several approaches have been proposed for overcoming both the traction problem and the weight distribution problem through the use of additional ballast being added to the cargo area. Most such approaches involve the use of hollow containers which when filled with a liquid or a granular material, such as sand, provide the additional weight as it is needed. When the weight is not needed, a drain is provided to remove the filler material.

Some of these approaches fit within the wheel-well cavity areas as vertical-standing containers such as that disclosed in U.S. Pat. No. 4,190,281 to Chandler. Distribution over the cargo bed of such containers allows for both counterbalancing a non-uniform cargo and to provide the additional traction weight for the road condition problem. A principal drawback in the use of such containers is that areas that would normally be used for cargo are occupied by the ballast containers.

To overcome this inefficient use of cargo space, systems have been proposed that incorporate shallow, flat fill-able cavities that cover the entire surface of the cargo bed, such as in the teachings of U.S. Pat. Nos. 4,796,914 to Raynor and 5,330,227 to Anderson. Raynor discloses a conformal shell that fits to the entire inside of a pickup bed cavity, and has a shallow hollow at the bottom of the shell for filling with a liquid to provide a uniform weight over the entire cargo bed. A drain valve is provided for removing the liquid when not needed. This provides a solution to the traction problems, but provides no relief to the weight distribution problem.

Anderson teaches a plurality of rectangular hollow beams that are laterally arranged to provide the "full-bed" coverage for the traction problem, but has the ability to remove one or more of the beams to accommodate the needs of a load distribution, although in a limited manner. The fill material is non-liquid, and can be inserted and removed through a removable end-cap. A bolted retaining bar secures the beams in place to the bed of the truck by interlocking with the end cap to prevent bouncing and movement of the ballast beams. A significant drawback is that counterbalancing weight cannot exceed that of a few filled beams. A further disadvantage is that the use of the non-liquid filler material creates a more difficult removal and storage issue over those using a liquid filler material and can be filled with a conventional hose.

To overcome the above drawbacks, the present invention provides for a plurality of fill-able interlocking plank-like hollow ballast containers that are secured to the truck bed. When interlocked laterally across the truck bed, such containers provide a solution to the traction problem. When stacked and secured vertically, the containers provide selective weight distribution for counterbalancing requirements. Further, the present invention provides a means for the easy removal of excess weight when it is no longer needed through either the removal of individual ballast elements or through the selective draining of the filler material.

SUMMARY OF THE INVENTION

In a preferred embodiment of the present invention, a multitude of interlocking low-profile hollow containers are assembled across the entirety of a cargo bed of a pickup truck and are secured to the bed of the truck with bolts. Each one of the hollow containers has recesses on the top surface at the aperture for the mounting bolts, such that the bolt heads are not projecting above the top surface of the container. When the individual containers are filled with a weighted material, such as water or sand, the flat weighted structure provides additional traction to the drive wheels of the truck on slippery road surfaces.

In an alternate embodiment, the filled containers are stacked at selective locations and secured to the truck bed with bolts to provide a counter-balancing weight for a heavy piece of cargo that is not placed in the gravitational center of the load platform.

Thus, a principal object of the invention is to provide a low-profile platform over the entirety of the bed of a pickup truck that can be filled as needed with a liquid or weighted granular material to provide additional wheel traction to the vehicle. This is accomplished by a horizontal arrangement of a multitude of the ballast containers each having interlocking edges for mating with an adjacent ballast containers.

Another object of the invention is to provide a vertical arrangement of the ballast containers to provide for counterbalancing a cargo load, which would otherwise cause a tilt in the loaded vehicle.

Another object of the invention is to provide a means for a simultaneous arrangement both in the vertical and the horizontal orientation of the low-profile containers to provide for both extra weight and the counter-balancing a cargo load.

Another object is to provide a convenient means of filling or emptying said ballast material.

Another object of the present invention is to provide a flexible container that will not rupture when the contained liquid expands on freezing.

Another object of the present invention is to provide a container that when filled will not weight more than 50 pounds.

Another object of the present invention is to provide a container having smooth edges to facilitate handling the thougth special equipment.

Another object of the present invention is to provide a container that is no more than a few inches in height.

DETAILED DESCRIPTION OF THE INVENTION

Light trucks, such as pickups, often exhibit performance problems when either unloaded or poorly loaded. When unloaded, such trucks have poor traction during slippery road conditions. When heavily loaded, but with an improper weight distribution, driving can be unsafe due to tilt of the vehicle. The present invention provides for a multiplicity of individually weighted ballast elements that can be configured to provide additional weight distribution to overcome both of the above problems.

Figure 1:
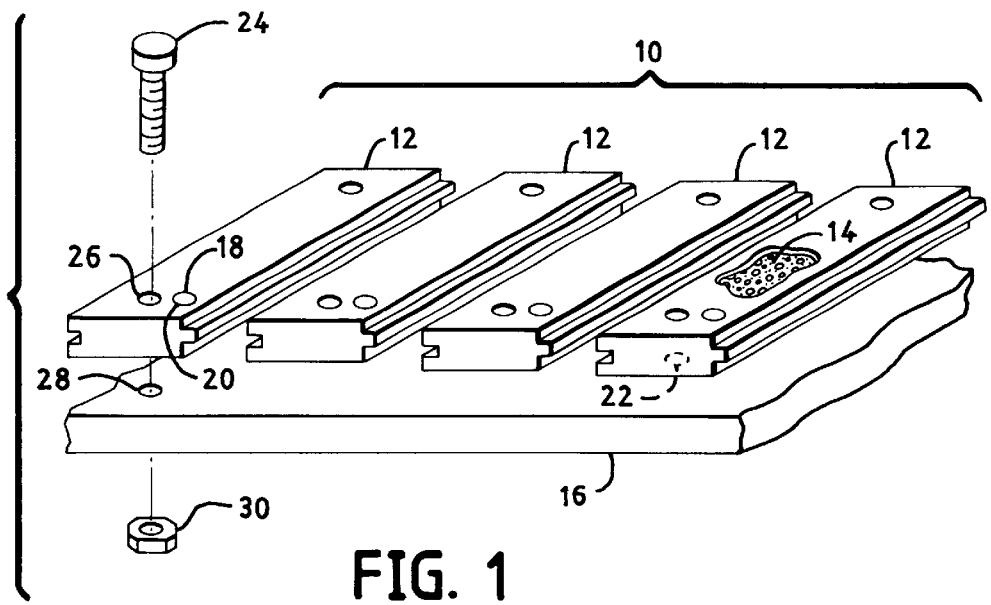
FIG. 1 shows a system for providing horizontal ballast to the cargo bed of a pickup truck according to the present invention.

FIG. 1 shows a system for providing ballast to a cargo bed of a pickup truck according to a preferred embodiment of the present invention. A platform structure 10 using a multiplicity of interlocking low-profile hollow sectional containers 12 that are filled with a weighted material 14, such as a liquid or granular material, provides a uniform additional weight to the cargo bed 16 of the truck. Such structure 10 occupies very little of the storage volume of the cargo bed 16, allowing normal loading of the cargo area.

Each hollow container 12 is preferably constructed of a flexible polymer material or lightweight metal that has sufficient strength to support the loads place on it, but has a light enough weight to be easily moved. Such strength can be provided by additional material thickness of container 12, but would be preferably be provided by the inclusion of integrated rigid structures or braces in container 12. An exemplary length of container 12 would be approximately 6 to 8 feet and would match the length of cargo bed 16. Exemplary widths of container 12 would be 8 to 12 inches, with exemplary depths of 1 to 2 inches. Such a low profile configuration allows for ballast containers which are easily handled, and which do not substantially reduce the capacity of the truck bed. It is desirable to make the containers as shallow as possible, to leave room in the truck bed for cargo, and to keep the center of gravity low.

As an example, a container 8 feet long, 10 inches wide, and 2 inches in depth would weight about 70 lbs. when filled with water, which is considered a maximum desirable weight for one container.

When filled with filler material 14 through a filler port 18, container 12 could have an exemplary weight of less than 50 pounds. This allows for easy maneuvering of filled containers 12 to construct platform 10. A plug 20 made of a resilient material, such as rubber, soft plastic, or cork, is used to close and seal the filling aperture of port 18. When additional weight is not needed, the filler material 14 can be drained via a drain port 22. Due to the relatively light weight of filled container 12, a single fill/drain port can be used and preferably be located on the top of container 12. To function as a drain, container 12 is flipped over to position the fill/drain port at the bottom, allowing the filler material 14 to pour out.

While filling material 14 for container 12 can be sand, the storage requirement for such granular material when not in use is less than desirable. On the other hand liquids, such as water, are readily available and can be drained with no storage requirement. However, in colder weather, such liquids would have to include an anti-freeze agent to prevent freezing. An alternative to such anti-freeze agent is construction of the container from sufficiently flexible material that expansion from freezing will not rupture the container.

To prevent dislodgement, bouncing and shifting during travel, platform 10 is secured to cargo bed 16 with threaded bolts 24 that extend through retaining holes 26 in each container 12 and through holes 28 in cargo bed 16 and a retaining nut 30. Alternate mechanisms, such as spring-loaded clamps, straps, and opposing sliding flanges, can also be used to secure platform 10 to cargo bed 16.

Figure 1A:
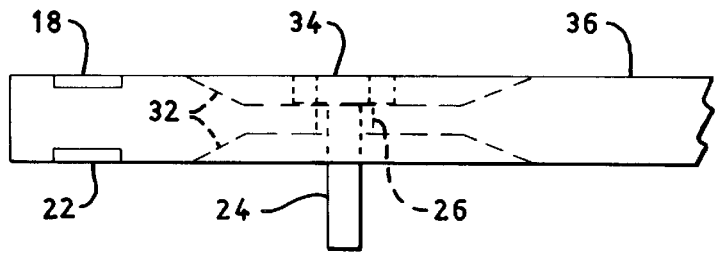
FIG. 1a shows an expanded side view of the ballast of FIG. 1 at the connection aperture.

FIG. 1a shows an expanded side view of the ballast of FIG. 1 at the connection aperture 26. A recessed area 32 around aperture 26 has sufficient width and depth to accommodate bolt 24 such that the top of bolt head 34 does not project above the top surface 36 of container 12. This allows assembled platform 10 to have a smooth flat surface that will not interfere with any cargo placed in cargo bed 16. The reverse side of container 12 will preferably also have a mirror-image recessed area 32, so that the containers can be used without having to worry about adjusting the orientation. The recesses 32, together with the flexible material from which the ballast containers are formed, also provide a means for avoiding rupturing of the water-filled containers due to freezing, as the recesses provide further expansion room for the water within the containers.

While it is desirable to have both a filler port 18 on the top surface and a drain plug 22 on the bottom surface, a single port 18 can allow both the filling and draining of filler material 14, since containers 12 are of sufficiently light weight to be moved and easily flipped over for draining.

The containers are molded in such a way that the apertures 26 which extend through the containers are sealed off from the rest of the container, so that the only means for the filler material to exit from the containers is through the filler or drain holes.

Figure 1B:
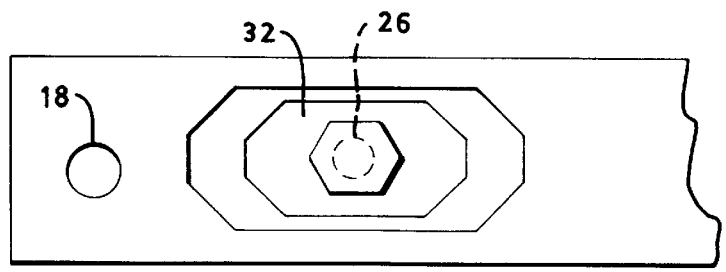
FIG. 1b shows an expanded top view of the ballast of FIG. 1 at the connection aperture.

FIG. 1b shows an expanded top view of the ballast of FIG. 1 at the connection aperture 26. Recessed area 32 can be large enough to easily accommodate a variety of bolts 24, or it can be as small as the bolt head to be as inconspicuous as possible. Although fill/drain port 18 is shown as being at the end of container 12, it can be placed anywhere on container 12 that is appropriate to a specific application.

Figure 2:
FIG. 2 shows a cross-sectional view a ballast container of FIG. 1 featuring a tongue-and-groove edge mating arrangement.
Figure 3:
FIG. 3 shows a cross-sectional view a ballast container of FIG. 1 featuring a lapped edge mating arrangement.

To simplify the assembly of platform 10, the number of attaching bolts 24 and nuts 30 can be reduced through the use of an interlocking edge configuration on containers 12 that holds such edges in mating alignment with the edges of adjacent containers 12. Exemplary alignment edges are be a tongue-and-groove arrangement as shown in the cross-sectional view of FIG. 2 or a lapped arrangement as shown in the cross-sectional view of FIG. 3. By constraining the vertical movement of the edges of containers 12, bolts can be satisfactorily employed only on the outermost containers 12 of platform 10. Any attempted vertical movement of a single sectional container 12 would be restrained by either strategically placed bolts 24 or by weighted adjacent sectional containers 12.

Figure 4:
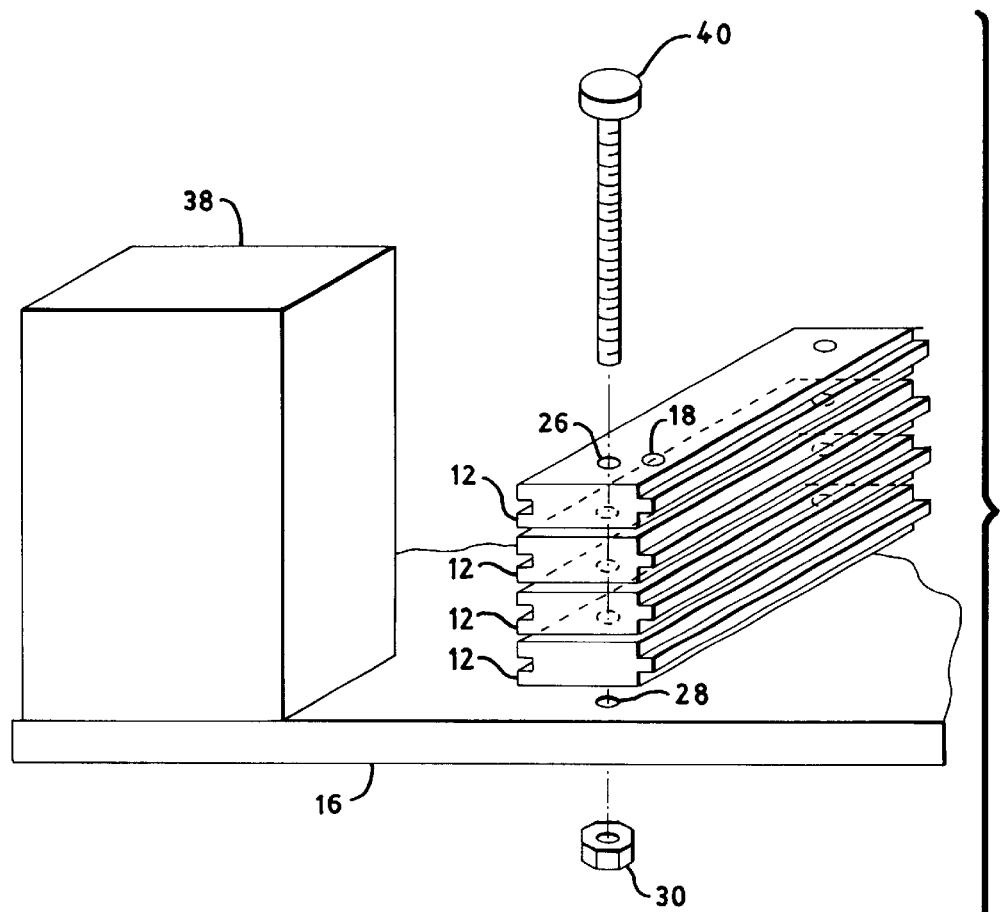
FIG. 4 shows a counterbalancing arrangement of the ballast containers, wherein the containers are stacked on one side of the cargo bed.

In an alternate embodiment of the present invention, the aforementioned filled containers 12 can be stacked in a vertical arrangement to provide additional weight, or alternatively, concentrated weighting at specific locations in cargo bed 16 to counter-balance an off-entered heavy weight, such as a load 38 as shown in FIG. 4. By using a longer attaching bolt 40 that traverses retaining holes 26 of multiple containers 12, a stacked assembly is secured to cargo bed 16. Additionally, to simplify the weight distribution, containers 12 that are located beneath cargo 38 can be removed as required.

Figure 5:
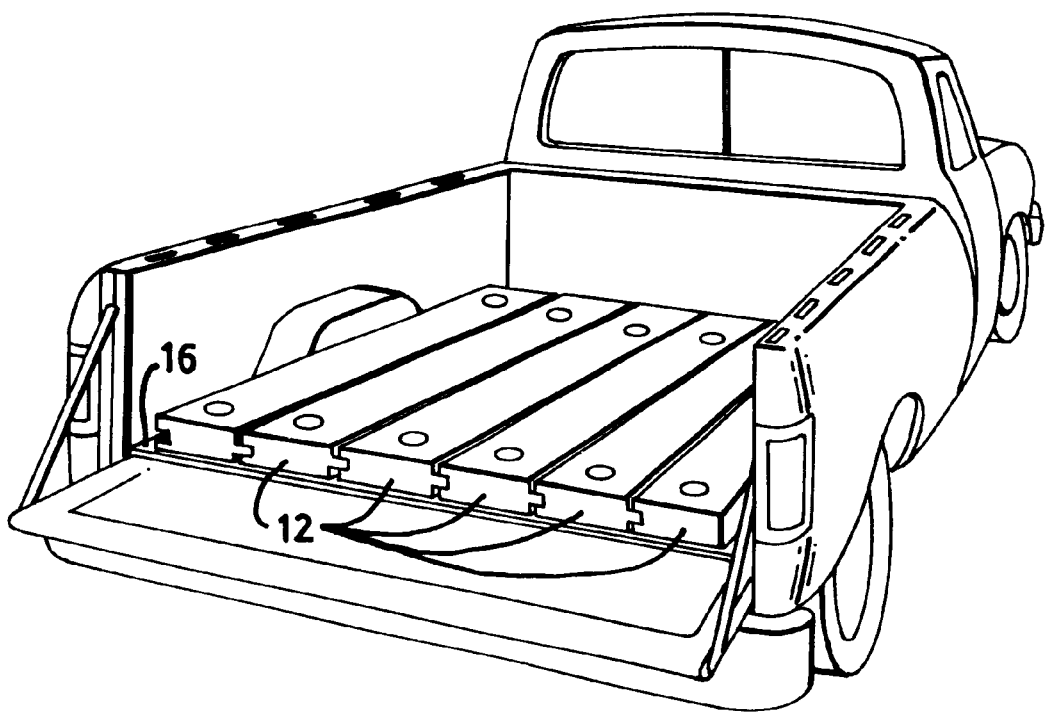
FIG. 5 shows the ballast containers affixed within a truck bed.

A truck bed, with the ballast containers affixed, is shown in perspective view in the drawing of FIG. 5. A single horizontal row of the ballast containers 26 is depicted, attached to the bed itself 12. In this figure, the height of the containers is exaggerated for the sake of clarity. Even as shown in this figure, the low-profile containers do not significantly decrease the load-carrying capacity of the truck bed.

It would be evident to one skilled in the art that multiple variations on the vertical alignment and retention mechanical details can be used with the same result. For example, keyed projections on the bottom of a container 12 fitting into vertical depression on an adjacent container 12 would prevent lateral movement of the weighted stacks. Alternatively, an opposing spring-loaded sliding flange arrangement can provide the same positive interlocking of adjacent containers 12. With such simple alignment implementations, a localized simple cargo strap with slide or pinch clips could secure the entire assembly to cargo bed 16, and eliminate the need for holes in cargo bed 16.

While the foregoing discussion related to a preferred embodiment as applying to the genre of pickup trucks, the present invention can be used to other trucks and vehicles having a cargo bed.

Numerous modifications to and alternative embodiments of the present invention will be apparent to those skilled in the art in view of the foregoing description. Accordingly, this description is to be construed as illustrative only and is for the purpose of teaching those skilled in the art the best mode of carrying out the invention. Details of the embodiment may be varied without departing from the spirit of the invention, and the exclusive use of all modifications which come within the scope of the appended claims is reserved.

What is claimed is:

1. A system for providing uniform weight distribution in a truck cargo bed, comprising:
    a plurality of low-profile, laterally-interconnected hollow ballast containers made from a generally flexible material, each one having a top, a bottom, a first side, a second side, and two ends and having a length that is longer than the width, and each one further comprising:
    a complementary mating means on said first and second sides for interconnecting with adjacent ballast containers;
    at least one aperture for filling and/or draining said ballast container with a weighting material;
    at least one plug for sealing said aperture; and
    a securing means for attaching said structure to a bed of a truck.

2. The system of claim 1, wherein the complementary mating means comprises an interlocking connecting arrangement, selected from a list which consists of a tongue and groove connecting arrangement, and an overlay connecting arrangement.

3. The system of claim 2, wherein each ballast container has formed within it a mounting passage extending vertically through a filler chamber of the ballast container through which a bolt may be used to affix the ballast container to the cargo bed, said mounting passage sealed off from the filler chamber so that weighting material may not escape from the filler chamber through the mounting passage, and wherein each such aperature leads out to a recess in the top surface of each one of said ballast container for accepting the head of a bolt without projection above said top surface.

4. The system of claim 3, wherein each ballast container has a height of approximately 2 inches or less.

5. A method for improving the stability of in a truck cargo having a bed, the method comprising:
    assembling a plurality of low-profile, laterally-interconnected hollow ballast containers to the bed, each container made from a generally flexible material, each one having a top, a bottom, a first side, a second side, and two ends and having a length that is longer than the width, and each one further comprising:
    a complementary mating means on said first and second sides for interconnecting with adjacent ballast containers;
    at least one aperture for filling and/or draining said ballast container with a weighting material;
    at least one plug for sealing said aperture, filing each such ballast container with the weighting material;
    mating at least one ballast container to at least one other ballast container; and
    affixing the plurality of ballast containers by means of a multiplicity of bolts, each passing through a ballast container, through the bed, and being secured with a nut.

6. The method of claim 5, wherein the complementary mating means comprises an interlocking connecting arrangement, selected from a list which consists of a tongue and groove connecting arrangement, and an overlay connecting arrangement.

7. The method of claim 6, further comprising forming within each ballast container an mounting passage extending vertically through a filler chamber of the ballast container through which a bolt may be used to affix the ballast container to the cargo bed, said mounting passage sealed off from the filler chamber so that weighting material may not escape from the filler chamber through the mounting passage, and wherein each such aperature leads out to a recess in the top surface of each one of said ballast container for accepting the head of one of the bolts without projection above said top surface.

8. The method of claim 7, further comprising vertically stacking at least one ballast container above another ballast container, and affixing the vertically stacked container to the truck bed by passing a bolt through the mounting passage in the vertically stacked container, through the ballast container beneath, and thence into the truck bed, then securing the bolt with a nut.

9. The method of claim 8, wherein each ballast container, when filled, weighs seventy pounds or less.

* * * * *